Figure 1:
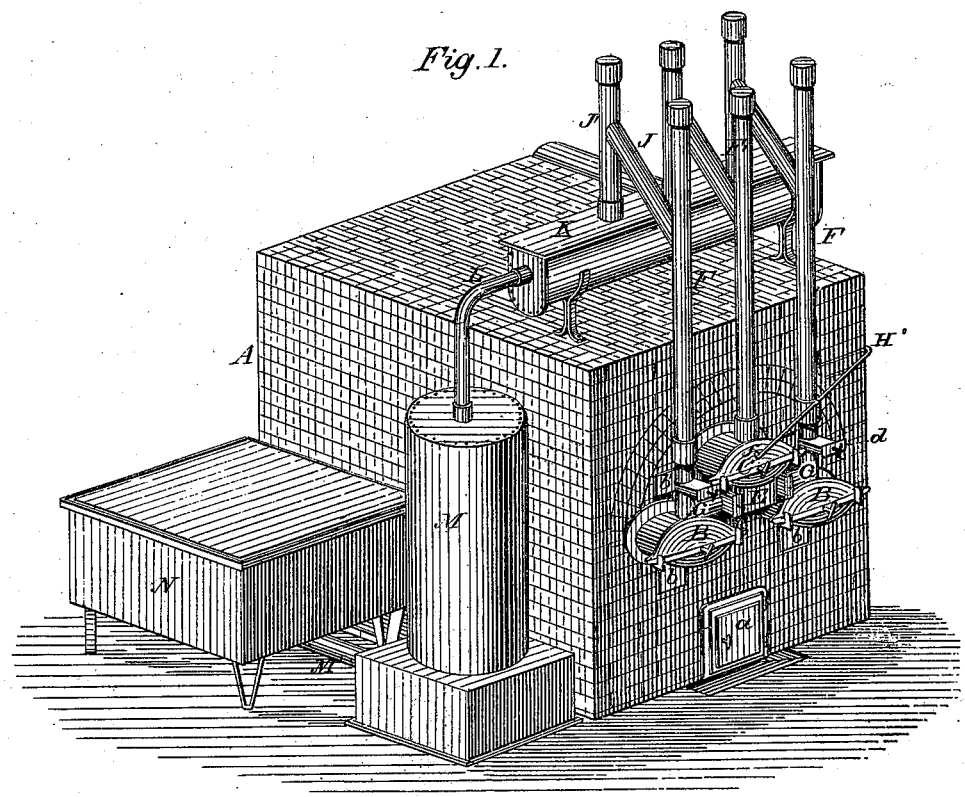

6 Sheets—Sheet 1.

F. H. EICHBAUM.
APPARATUS AND PROCESS FOR MANUFACTURING ILLUMINATING GAS.

No. 174,502. Patented March 7, 1876.

Attest:
R. N. Dyer.
Charles Thurman.

Inventor:
Frederick H. Eichbaum

F. H. EICHBAUM.
APPARATUS AND PROCESS FOR MANUFACTURING ILLUMINATING GAS.

No. 174,502. Patented March 7, 1876.

F. H. EICHBAUM.
APPARATUS AND PROCESS FOR MANUFACTURING ILLUMINATING GAS.
No. 174,502. Patented March 7, 1876.
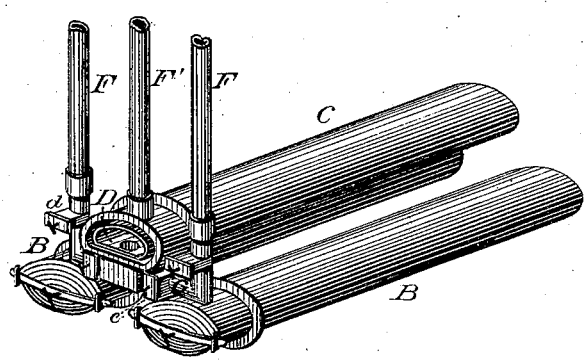
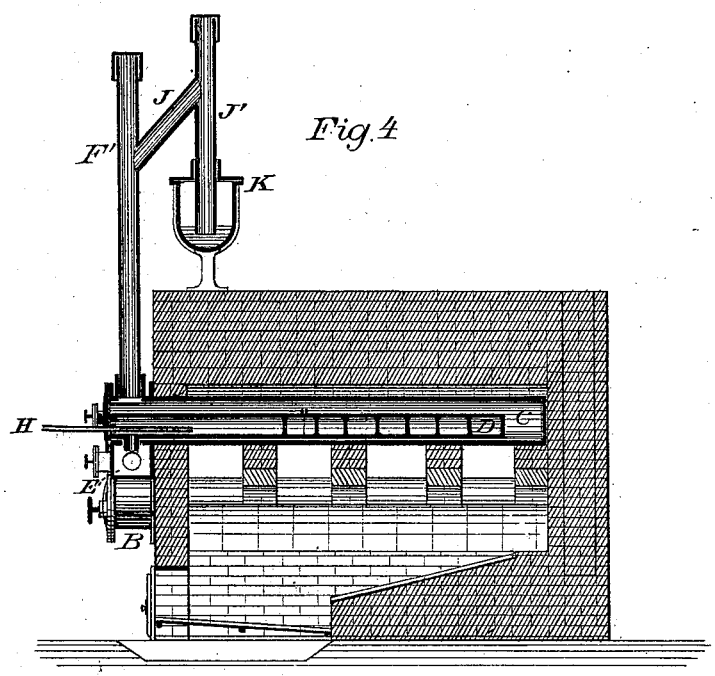

F. H. EICHBAUM.
APPARATUS AND PROCESS FOR MANUFACTURING ILLUMINATING GAS.

No. 174,502. Patented March 7, 1876.

Attest:
R. N. Dyer.
Charles Thurman.

Inventor:
Frederick H. Eichbaum

F. H. EICHBAUM.
APPARATUS AND PROCESS FOR MANUFACTURING ILLUMINATING GAS.

No. 174,502.	Patented March 7, 1876.

Attest:
R. N. Dyer.
Charles Thurman.

Inventor:
Frederick H. Eichbaum

6 Sheets—Sheet 6.
F. H. EICHBAUM.
APPARATUS AND PROCESS FOR MANUFACTURING ILLUMINATING GAS.
No. 174,502. Patented March 7, 1876.
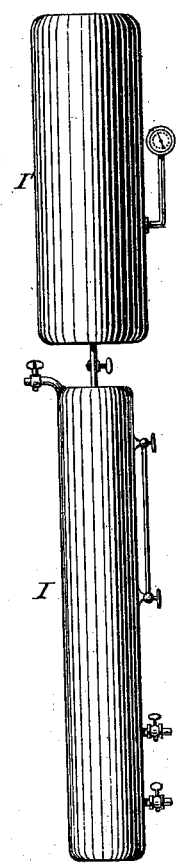
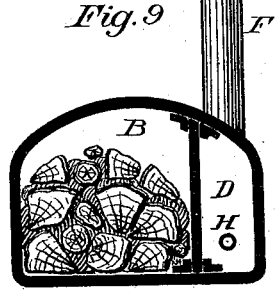
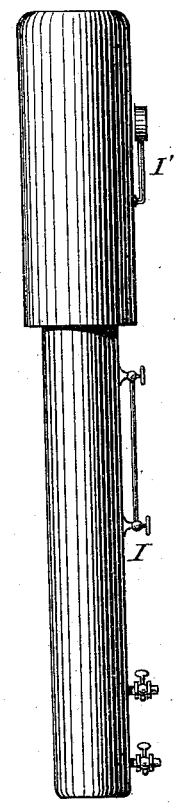
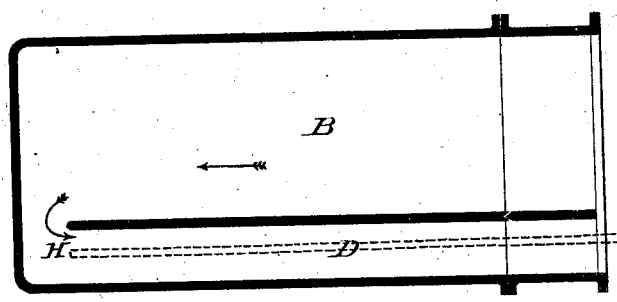
Attest:
R. N. Dyer.
Charles Thurman.
Inventor:
Frederick H. Eichbaum

UNITED STATES PATENT OFFICE.

FREDERICK H. EICHBAUM, OF DETROIT, MICHIGAN.

IMPROVEMENT IN APPARATUS AND PROCESSES FOR MANUFACTURING ILLUMINATING-GAS.

Specification forming part of Letters Patent No. 174,502, dated March 7, 1876; application filed February 8, 1876.

*To all whom it may concern:*

Be it known that I, FREDERICK H. EICHBAUM, of Detroit, in the county of Wayne and State of Michigan, have invented a new and Improved Apparatus and Process for the Manufacture of Illuminating-Gas; and I do hereby declare that the following is a full and exact description of the same, reference being had to the accompanying drawings, and to the letters of reference marked thereon.

The object I have in view is a more perfect apparatus and process for the manufacture of illuminating-gas, and of a gas suitable for enriching coal-gas from wood and oil gases, which apparatus and process is an improvement upon the patent for apparatus granted to me by the United States September 21, 1875, numbered 168,006, and upon the patent for process granted to me by the United States June 22, 1875, numbered 164,822; and my invention therein consists, as to the apparatus: in the combination and arrangement of the principal operative parts, consisting of the inclosed retort with open ends, and in two parts, the same retort having central interior supports; and an oil-supply pipe with a coupling-joint tapped directly through the lid, all as more fully hereinafter described and explained.

As to the process: in producing a very rich gas from the destructive distillation of wood and a large quantity of hydrocarbons, the wood-gases taking up and carrying along the hydrocarbon gases in the act of distillation, and converting the two gases in the same retort into a single homogeneous gas, and combining the same with poor coal-gas.

In order to enable those skilled in the art to use my apparatus and process, I now proceed to describe the same, having reference to the drawings, in which—

Figure 14:
Figure 15:
Figure 2:
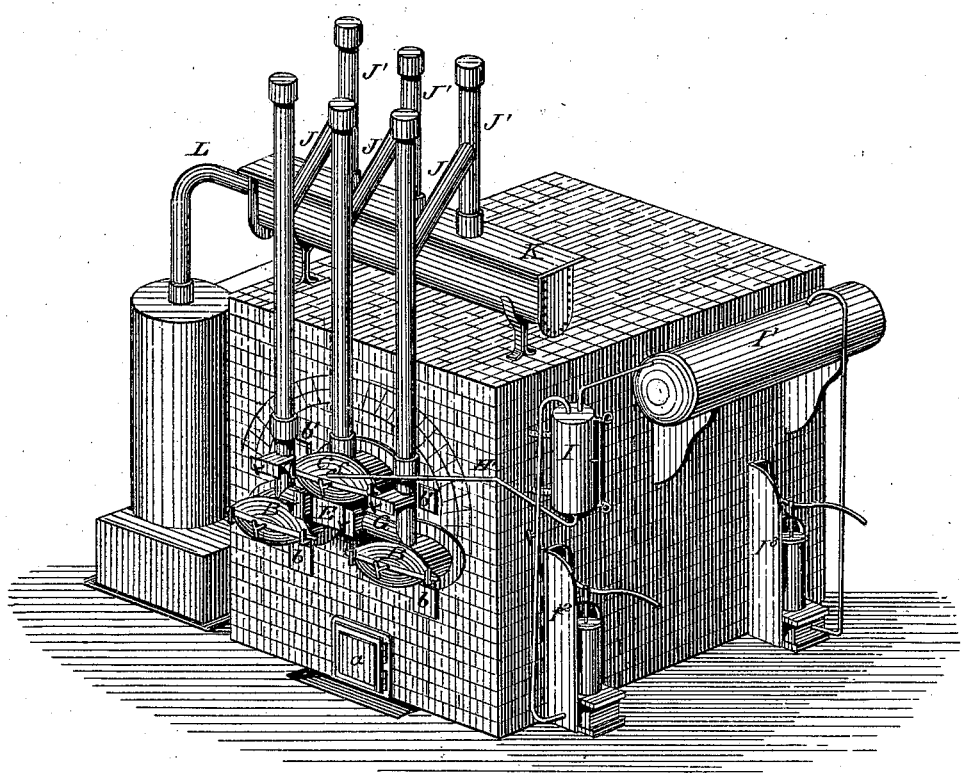
Figure 13:
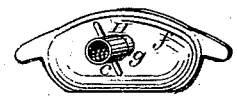
Figure 5:
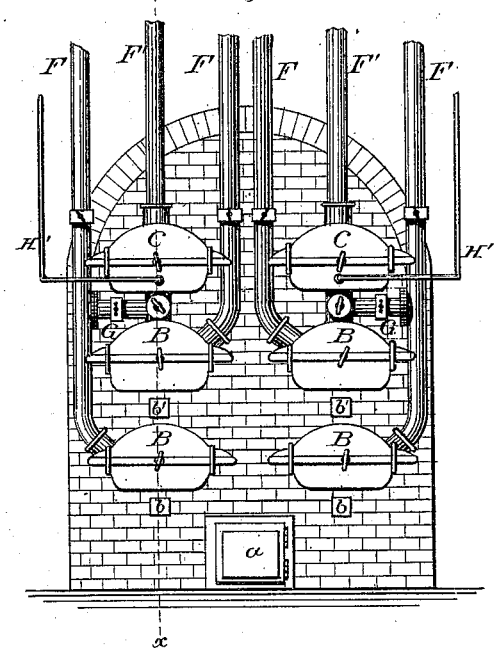
Figure 6:
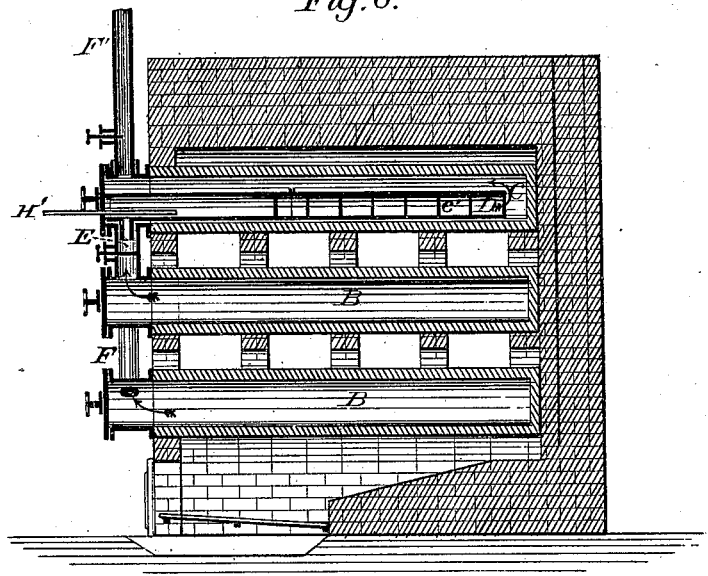
Figure 8:
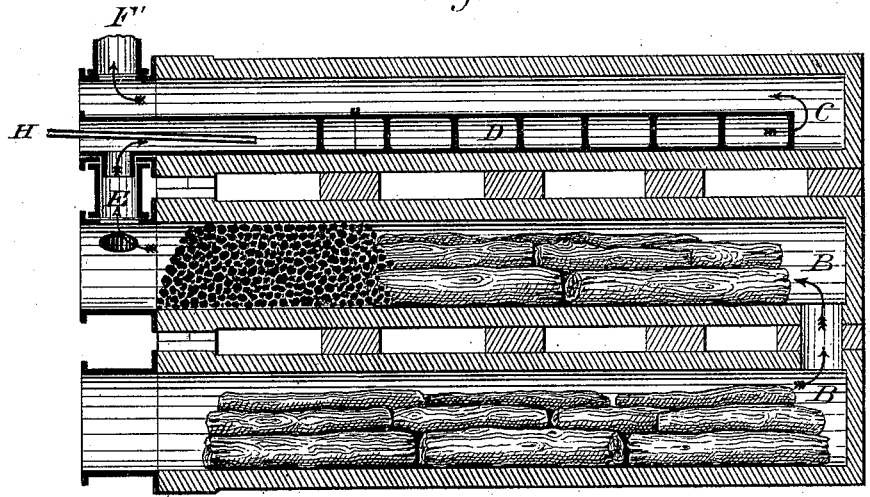
Figure 7:
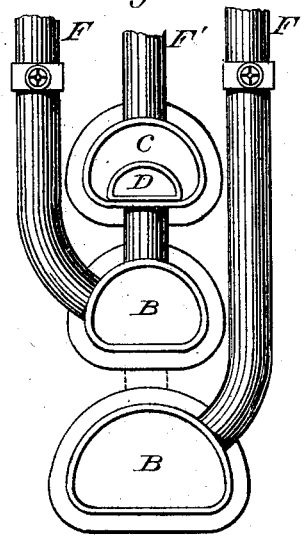

Figure 1 is a view, in perspective, of one of my benches for three retorts, showing the front, top, and one side of the same. Fig. 2 is a similar view, showing the front, top, and the other side of the same; Fig. 3, a perspective view of the retorts detached from the furnace; Fig. 4, a vertical longitudinal central section of the same; Fig. 5, a front elevation of a bench of six retorts; Fig. 6, a vertical longitudinal section of the same, on line $x\,x$ of Fig. 5; Fig. 7, a modified form of a bench of three retorts, showing a front elevation of the retorts; Fig. 8, a vertical central longitudinal section of the same bench; Fig. 9, an end view of a modification of a single retort, for use in a bench with one or more retorts; Fig. 10, a plan view of the same. Figs. 11 and 12 are modifications of the oil-feeders; Fig. 13, a front view of a retort-lid, with the coupling and oil-pipe inserted; Fig. 14, a vertical central longitudinal section of the inclosed retort; and Fig. 15, a cross-section of the same.

Like letters denote corresponding parts in each figure.

In the drawings, A represents the bench-setting, built up of bricks in the usual way for coal-gas works, and of the dimensions most commonly used in such works, and provided with the usual fire-box door $a$, flue-stoppers $b$, and sight-hole stoppers $b'$. B B represent retorts, in which the wood is distilled, which retorts are of the size and shape and set in the manner usual in coal-gas works. C is the upper retort, in which the gases are combined, and contains an inclosed retort, D, which has a connecting-pipe, $c$, leading into the chamber E, upon the under side of the retort C, all as described in my said patent 168,006, with the exception of the retort D. This retort is, preferably, made in two parts, of about equal length, so that the rear portion, which is liable to be destroyed by heat, may be conveniently replaced, and the rear portion is also provided with central supports $c'$, which serve to preserve the integrity of the retort, it being subject under the great heat to lose its form and to have the upper part settle upon the bottom.

F F F' represent the stand-pipes, which extend from the upper portions of the mouth-pieces of the retorts B B and C. G G are the branch pipes, which connect the stand-pipes F F with the chamber E. $d\,d$ are valves in the stand-pipes F F; and $e\,e$ are valves in the branch pipes G G, all as described in my said patent 168,006.

Instead, however, of the removable stopper to the inclosed retort D, as described in said patent 168,006, I have said retort extend out so far that the inner surface of the lid $f$ closes tightly against it, and by proper luting the joint is made air-tight.

Through this lid $f$ there passes a pipe, H, extending into the retort D a short distance beyond the opening of the pipe c, and also extending out in front of the lid a short distance, (shown by g,) where it may be threaded. Another pipe, H', with a threaded inner end of the same size as the end g of the pipe H, is connected with said pipe by means of a nut or other suitable coupling, so as to be conveniently detached when it is desired to remove the lid f. The pipe H' extends across the front of the bench setting to the measuring device, which measuring device is described in the Letters Patent of the United States numbered 165,809, granted to me July 20, 1875. In this device I represents the measuring-vessel, I¹ the air-reservoir, I² the oil-pump, and I³ the air-pump.

In small works, however, I find that I can dispense with the air-pump I³ by placing a stop-cock between the measuring-vessel and the air-reservoir, and providing the measuring-vessel with a vent-valve, as shown in Fig. 11. Then by pumping the measuring-vessel full of oil, the air previously contained in such vessel is forced into the air-reservoir. By means of the stop-cock, this air is prevented from flowing out of the air-reservoir. The oil in the measuring-vessel is then suffered to run back, the vent-valve being opened into the tank, when the measuring-vessel fills with air. This vessel is then pumped full of oil again, which forces the air in it into the air-reservoir, and this process is continued until a sufficient quantity of air is stored in the air-reservoir.

Fig. 12 shows a modification of the same, where the measuring-vessel is directly united to the air-reservoir. The stand-pipes F F F' have the usual bridge-pipes J and dip pipes J' leading into the hydraulic main K, out of which leads the exit-pipe L, leading into the condenser M in the usual way.

It will be found, however, in the manufacture of my gas, which passes into the hydraulic main at a higher temperature than coal-gas, that it will be necessary to introduce a larger flow of water into said main than is required for coal-gas, the object being to cool the gas somewhat, and to carry off the fine charcoal-dust, which otherwise would accumulate around the dip-pipes. On the other hand it will be found that scarcely any water will be required in the condenser for spraying the gas, as compared with the amount for spraying coal-gas.

N is a purifier of ordinary construction, connecting, by the pipe M', with the condenser, and connecting by a pipe (upon which is usually placed a station-meter) with the gas-holder. When this gas is used for enriching coal-gas, it should preferably unite with the same after the coal-gas has passed the purifiers and before it enters the gas-holder.

Figs. 5 and 6 represent the construction and arrangement of my six-retort bench, where it will be observed that the retorts B and B are placed one directly above the other, and the retort C, having the inclosed retort D, directly above the retorts B. The stand-pipes F and F, it will noticed, spring from opposite sides of the tops of their respective retorts, and the chamber E connects directly the upper retort B with the retort C, while this chamber is connected with the lower retort B by its proper branch pipe G. Figs. 7 and 8 represent a bench of three vertical retorts, constructed and arranged precisely like either of the pairs of three retorts in Figs. 5 and 6, except that the two retorts B B are connected at their rear ends by a hollow saddle-block. Figs. 9 and 10 represent a bench with a single retort, adapted for small works, as, for instance, for use in hotels and mills, having only the stand-pipe F', and having its retort D inclosed in one side of the retort B.

All of the various modifications present substantially the same construction, and are operated in substantially the same way.

The manner of use of my apparatus is as follows: The works being started freshly, or for the first time, a suitable fire being in operation in the fire-box, and the retorts being well heated—but a little less than in ordinary use for making coal-gas—I place in the retorts B B a certain charge of wood, preferably of the non-resinous woods, and as dry as possible, and secure the lids closely upon the mouths of such retorts. This charge varies with the size of the retorts and the specific weight of the wood, but usually, with the retorts of the size commonly employed for making coal-gas, the charge should be from one hundred to three hundred pounds in each retort, sufficient being used to fill the back end of the retort pretty closely, and much less at the front end. For example, the retorts are usually long enough for two lengths of four-feet wood. Of the charge, then, with such wood, I should place about two-thirds in a layer at the back end of the retort, and one-third in a layer at the front end. This formula is predicated upon the supposition that it is intended to make an illuminating-gas of sixteen to eighteen candle power. If, however, it is desired to make a gas of thirty-five to forty-five candle power, to enrich coal-gas in cold weather, when otherwise cannel-coal would be used for that purpose, the charge of wood in each of the retorts B B should not exceed one hundred and fifty pounds, nearly all of which is placed at the back end of the retort. After this charge of wood is thus placed in the retorts I prefer to fill up the space in front with charcoal derived from a previous distillation, and still incandescent, although this part of the process may be omitted.

In following out the process of making illuminating-gas of sixteen to eighteen candle power, the wood being placed in the retorts B B, as described, distillation immediately commences, even before the lids can be closed over the mouths of the retorts, and during this time the valves in the stand-pipes F F should be opened to allow the gas to pass directly to the hydraulic main, as if such valves were closed at this time the evolving gases would burst the retort.

As soon as the lids are properly closed over the mouths of the retorts, then the valves in the branch pipes are opened, and those in the stand-pipes F F are closed. The gases are thus diverted into the chamber E, from which they pass up into the inclosed retort D, through such retort to the back end of the same, then back over the top of the same, within the retort C, into the stand-pipe F'.

At the commencement of this operation it is understood that the measuring-vessel has been filled to a certain point, as indicated by its gage, and the proper adjustment having been made for the certain flow per hour, there will be delivered into the retort, through the pipe H', a certain quantity of fluid hydrocarbons at a certain regular rate. Of such hydrocarbons I use, preferably, petroleum, or any of the fluid products of petroleum, as may be cheapest in the market.

If it is desired to make illuminating-gas of sixteen to eighteen candle power, there should be supplied from two and one-half to three gallons of the hydrocarbons named to every one hundred pounds of sound dry woods placed in the retorts, but where resinous woods are used, the quantity of hydrocarbons would be less.

If it is desired to make an enriching-gas for coal-gas, from thirty-five to forty-five candle power, the quantity of such hydrocarbons would be increased to six or eight gallons to each one hundred pounds of sound dry wood in each retort, which amount can be used without any waste of such hydrocarbons.

This fluid hydrocarbon, as described, issuing from the mouth of the pipe H, a little distance, as described, within the mouth of the retort D, becomes vaporized as it leaves such pipe, and in that condition, as it is moving toward the rear end of retort D, is overtaken, taken up, and carried along by the wood-gases flowing through such retort in the same direction, as before described. The two gases pass along the retort retarded by friction with the central supports $c'$ and the sides of the retort D, and thus are mixed, united, and combined into a single homogeneous gas. Passing out of the rear end of this retort, the combined gas passes into the retort C, and to the front of the same and into the stand-pipe F'. As, however, the area of this retort C, above the retort D, is greater than the area of the stand-pipe F', the gas is retarded yet more in this retort, and is there subjected to an intense heat, owing to the reverberation from the top of the arch, which converts it into a permanent or fixed illuminating-gas.

Up to this point it will be observed that the wood-gas, from the instant of its leaving the retort where it was generated, has been constantly subjected to a temperature gradually increased up to the period of complete union with the oil-gas in the retort C, and the oil-gas has, from its point of generation in the retort D, been likewise subjected to a constantly-increasing heat until the period of its complete union with the wood-gas in the retort C. The gas, then passing up into the hydraulic main, proceeds onward in its course, subject to the various manipulations and treatments to which coal-gas is usually subjected, with the exception, before noted, that a larger supply of water is required in the hydraulic main, and scarcely any water for spraying until it reaches the gas-holder.

It should be observed that the retorts B B are to be kept during this process at a temperature a little lower than that used in making coal-gas, and the retorts should be so set in relation to the fire-box and the arch that the mixing-retort should always be a little the hottest. It will also be observed that, as usual in the instance of coal-gas retorts, the rear end of each retort will be more highly heated than the front end of the same.

In practice it will be found, in order to keep up a continuous process, that the retorts B B should be charged alternately.

The carbonic acid which constitutes so large an element in wood-gas, and hitherto has prevented the successful use of wood in making illuminating-gas, is by my process largely converted into carbonic oxide in passing first through the charcoal portion of the charge, then in being brought into intimate union with the carbon of the hydrocarbons in a finely-divided condition in the inclosed retort D, and ceases to be a detrimental element in the gas.

Among the advantages of my apparatus and process are as follows: It can be applied to coal-gas works at a very slight expense, and with no material alteration of existing works, and with no change whatever of the service or burners; the gas described can be made in double the quantity in the same length of time than if the same works were used to make coal-gas; in the item of wear and tear the retorts, which in coal-gas making do not last over eighteen months, by my process will last from three to five years, or as long as the supporting-settings will last, there being no deposit of carbon in the retorts; in the ease and simplicity of management, as it does not take over one-half of the manual labor to attend them required in coal-gas works, there being less of impurities to be removed.

Having thus described my invention, its manner of use, and some of its advantages, what I claim as new therein, and for which I desire Letters Patent, is—

1. In a gas-making apparatus, the combination of the inclosed retort D, open at each end and provided with supports $c'$, of the outer retort C, and the connecting-pipe $c$, substantially as and for the purposes set forth.

2. In a gas-making apparatus, the inclosed metallic retort D, made in two parts with flanges or ears, adapted to be clamped together end to end, so as to form a continuous retort, substantially as and for the purposes set forth.

3. In an inclosed gas-retort, the central vertical interior supports $c'$, substantially as and for the purposes set forth.

4. In a gas-making apparatus, and in combination with the retort C, and lid $f$, and the inclosed retort D, the pipe H, provided with a coupling-joint adapted for separation of the pipe, substantially as and for the purposes set forth.

5. The process, substantially as described, of enriching coal-gas by a rich gas produced from wood and petroleum, in the manner set forth.

This specification signed and witnessed this 8th day of February, 1876.

FREDERICK H. EICHBAUM.

Witnesses:
CHARLES THURMAN,
R. N. DYER.